(12) United States Patent
Kessler

(10) Patent No.: US 6,349,567 B1
(45) Date of Patent: Feb. 26, 2002

(54) PACKING WITH A CROSS CHANNEL STRUCTURE FOR A MATERIAL EXCHANGE COLUMN WITH A HIGH SPECIFIC SEPARATION PERFORMANCE

(75) Inventor: Alwin Kessler, Tuttwil (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/482,385

(22) Filed: Jan. 12, 2000

(30) Foreign Application Priority Data

Jan. 21, 1999 (EP) ............................................. 99810041

(51) Int. Cl.[7] ................................................. F25J 3/00
(52) U.S. Cl. ........................................................ 62/643
(58) Field of Search ............................ 62/906, 620, 643

(56) References Cited

U.S. PATENT DOCUMENTS

| 4,929,399 A | 5/1990 | Lockett et al. |
| 5,644,932 A | 7/1997 | Dunbobin et al. |

OTHER PUBLICATIONS

Dunbobbin, Hanley B., et al.: "A Unified Model for Countercurrent Vapor/Liquid Packed Columns. 1. Pressure Drop", in: *Ind. Eng. Chem. Res.* 1994, 33, 1208–1221.

Hanley, Brian, et al.: "A Unified Model for Countercurrent Vapor/Liquid Packed Columns. 2. Equations for the Mass–Transfer Coefficients, Mass–Transfer Area, the HETP, and the Dynamic Liquid Holdup" in: *Ind. Eng. Chem. Res.* 1994, 33, 1222–1230.

*Primary Examiner*—Henry Bennett
*Assistant Examiner*—Malik N Drake
(74) *Attorney, Agent, or Firm*—Townsend and Townsend and Crew LLP

(57) ABSTRACT

The packing (1) with cross channel structure for a material exchange column (2) should have a high specific separation performance. The packing is specifiable by a specific surface area, a, and an inclination angle of the passages, $\phi$. It belongs to a class of packings with $a=a_{cl}$ and $\phi=\phi_{cl}$ in accordance with the following assertions:

for fluids which flow in the packing, equally large fluid flows are in each case provided;

a number n of theoretical separation stages per meter which can be empirically determined for the packing, namely the parameter NTSM, can be represented by a first function $f_1(a, \phi)$ of the variables a and $\phi$;

a flow resistance which results for a gas flow which flows through the packing can be characterised by a pressure loss per meter, $\Delta p$, as a second function $f_2(a, \phi)$;

under the auxiliary condition n=const, $\Delta p$ assumes a relative minimum for which the variables a and $\phi$—in dependence on the parameter n—assume the values $a_m(n)$ and $\phi_m(n)$ respectively;

it is true that n>4.5, $a_{cl}<a_m(n)$, $\phi_{cl}>\phi_m(n)$ and $\phi_{cl}>45°$.

14 Claims, 2 Drawing Sheets

$$\sigma = 45° \; ; \; s = \sqrt{2}\,h,$$
$$a = \frac{s}{h/2} = \frac{2\sqrt{2}}{h}$$

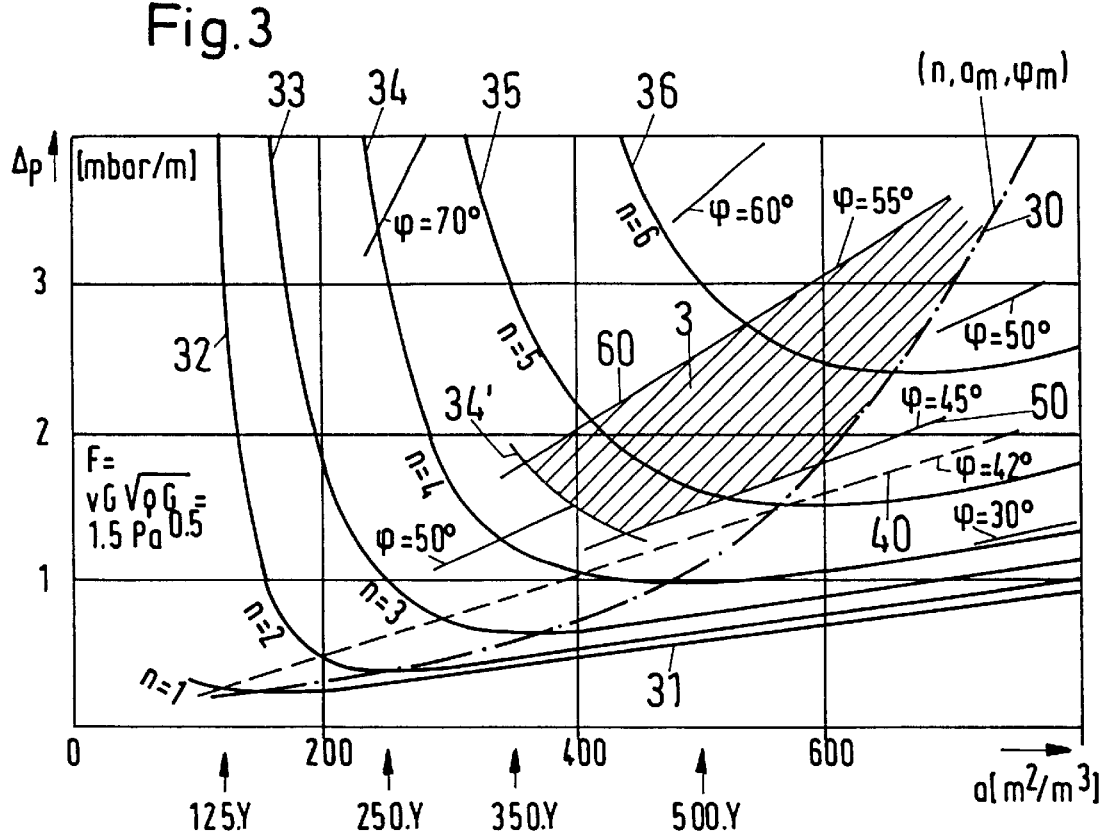

of this kind are known from WO 97/16247).

PACKING WITH A CROSS CHANNEL STRUCTURE FOR A MATERIAL EXCHANGE COLUMN WITH A HIGH SPECIFIC SEPARATION PERFORMANCE

BACKGROUND OF THE INVENTION

1. Field of the Invention

The invention relates to a packing with a cross channel structure for a material exchange column with a high specific separation performance, to a column with a packing of this kind and to a method for the operation of a column of this kind.

2. Description of the Prior Art

Packings with cross channel structure have already been known for many years (see e.g. DE-A 26 01 890). They are assembled as a rule from a plurality of packing elements which are arranged one above the other, with each packing element being constructed of a large number of parallel layers. The layers make contact and form the cross channel structure with mutually open flow passages which are inclined with respect to the vertical (column axis). A material and/or heat exchange can be carried out with a column packing of this kind, namely between a ripple film on the packing surface and a gas flow which flows through the passages.

In a standard treatise on distillation (H. Z. Kister, "Distillation Design", McGraw-Hill, Inc. 1992; pages 441–458) packings with cross channel structure for carrying out material separation processes are discussed. These packings are optimally utilizable when the specific separation performances which are required are not too high. The specific separation performance can be quantified through a parameter NTSM which specifies the number n of theoretical stages per meter (or in Kister the parameter HETP, "height equivalent of a theoretical plate", which is measured in inches and is substantially the reciprocal value of the parameter NTSM). The specific separation performance is considered here to be high when NTSM is greater than $4.5 \, m^{-1}$ (i.e. n>4.5).

In known uses it has turned out in practice that a class of packings in which the angle of inclination of the passages is in each case equally large is optimally utilizable. In the named treatise 45° is given as the value for this angle of inclination (see Kister, Table 8.1, in particular the class of packings "Mellapak®" 125.Y, 250.Y, 350.Y and 500.Y). In the packing class of "Mellapak®" (hereinafter, packings 125.Y, . . . ) this angle does not amount to 45° but rather to 42.5°; this angle has proven to be more favorable.

The inventor was confronted with the problem of making packings available for separation columns for which the specific separation performance is high and which is advantageous in particular in methods for air decomposition. In this he recognized that it is recommendable to carry out further basic experiments with respect to the manner of action of the packings with cross channel structure in order thus to be able to propose criteria for more economical packings as a result of newly won results.

SUMMARY OF THE INVENTION

The object of the invention is to create a packing with cross channel structure which is distinguished by a high specific separation performance and which enables as economical a separation process as possible. This object is satisfied by packings such as a packing with cross channel structure for a material exchange column having a high specific separation performance. The packing is specifiable by a specific surface area, a, and an inclination angle of the passages, A. It belongs to a class of packings with a $=a_{cl}$ and $\phi=\phi_{cl}$ in accordance with the following assertions:

for fluids which flow in the packing, equally large fluid flows are in each case provided for all packings;

a number n of theoretical separation stages per meter which can be empirically determined for the packing, namely the parameter NTSM, can be represented by a first function $f_1(a, \phi)$ of the variables a and $\phi$;

a flow resistance which results for a gas flow which flows through the packing can be characterized by a pressure loss per meter, $\Delta p$, as a second function $f_2(a, \Delta)$;

under the auxiliary condition n=const, $\Delta p$ assumes a relative minimum for which the variables a and $\phi$—in dependence on the parameter n—assume the values $a_m(n)$ and $\phi_m(n)$ respectively;

it is true that n>4.5, $a_{cl}<a_m(n)$, $\phi_{cl}>\phi_m(n)$ and $\phi_{cl}>45°$.

The invention will be illustrated with reference to two examples:

The packing 750.Y (specific surface area $a=750m^{-1}$, angle of inclination of the passages $\phi=42.5°$) has 5.5 separation stages per meter (n=5.5). If the angle is increased to 50°, then the packing surface area which is required for the material separation can be reduced to 500 $m^2/m^3$, through which the cost and complexity for the packing material is reduced to 66%. In this the separation performance, at a practically unchanged flow resistance of the packing (pressure loss $\Delta p=2$ mbar/m at $F=v_G\sqrt{\rho_G}=1.5 \, Pa^{0.5}$), likewise remains unchanged. Additional material could be saved for the same separation performance, at the price, however, of an increased flow resistance (for $a=450 \, m^{-1}$ and $\phi=57°$, $\Delta p=2.7$ mbar/m).

For the packing 500.Y ($a=500 \, m^{-1}$, $\phi=42.5°$), n=4.5. For $\phi=46°$, $a=450 \, m^{-1}$, i.e. the material cost and complexity is reduced to 90%, with the flow resistance being practically unchanged. For $\phi=50°$, $a=400 \, m^{-1}$, (material cost and complexity 80%), but the flow resistance increases to 123% of the value to be expected for the packing 500.Y.

BRIEF DESCRIPTION OF THE DRAWINGS

FIG. 3 illustrates a diagram in which the pressure loss is illustrated in dependence on the specific surface area for the packing in accordance with FIG. 2, and FIG. 4 illustrates a table with value triplets for a distinguished curve of the diagram of FIG. 3 according to one embodiment.

DETAILED DESCRIPTION OF SPECIFIC EXEMPLARY EMBODIMENTS

Figure 1:
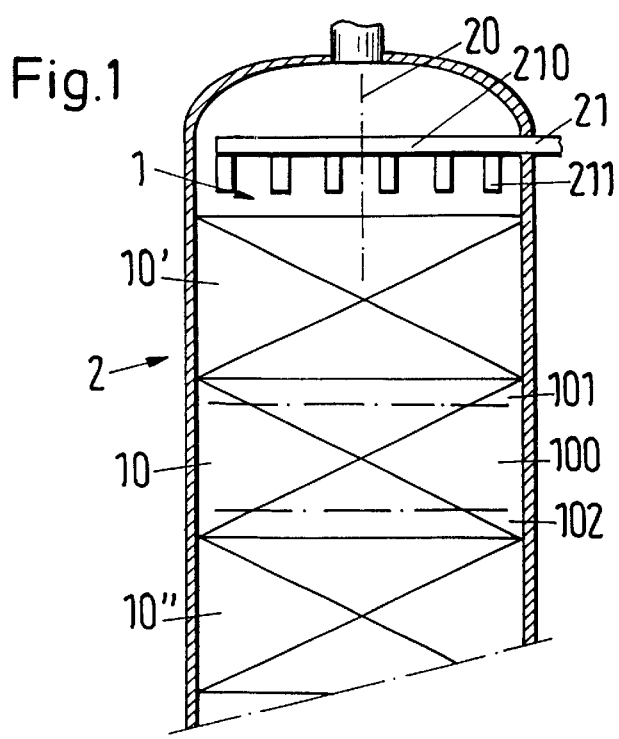
FIG. 1 illustrates an upper part of a column with packing elements.

A column 2 with an axis 20—in accordance with FIG. 1—contains a packing 1 and a liquid distributor 21 (infeed tube 210, distributor passages 211). A plurality of packing elements 10, 10', 10" are arranged one above the other. In special embodiments of the column 2 a lower zone 102, a middle zone 100 and an upper zone 102 are in each case distinguishable in the packing elements 10. In the zones 101 and 102 at the edges of the packing elements 10 the flow resistance is reduced with respect to that of the middle zone as a result of a suitable shaping. Advantageous embodiments of this kind are known from WO 97/16247).

Figure 2:
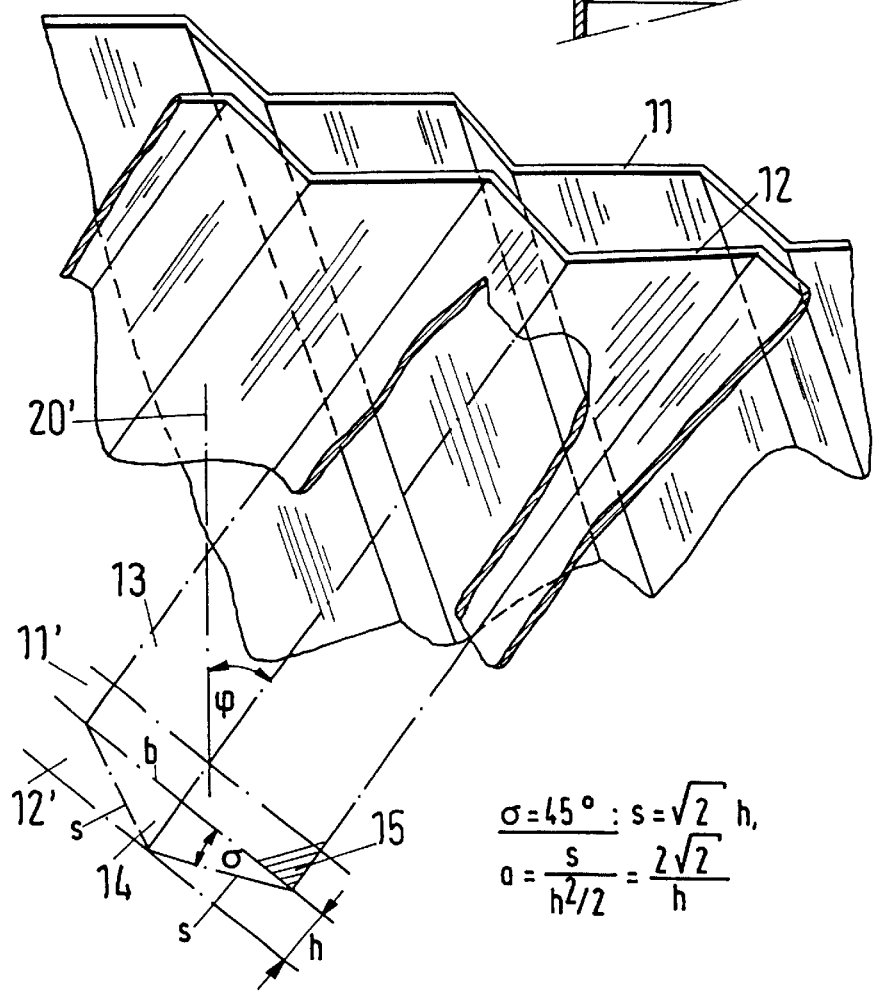
FIG. 2 illustrates a fragment of a packing with cross channel structure (ideal form of the Mellapak®)

Each packing element 10 is constructed of a large number of parallel layers 11', 12'—see FIG. 2. Parallel passages 13 with triangular cross-sections 14 are formed in the layers 11', 12' by films 11, 12 which are folded in zigzag shape. (The films 11, 12 can also for example be corrugated sinusoidally.) The passages are inclined with respect to the vertical 20' (which is parallel to the column axis 20): they subtend an angle of inclination ϕ to it. At the contact plane 15 between adjacent layers 11' and 12' the passages 13 of the layer 12' which are open in this plane 15 cross corresponding passages of the adjacent layer 11'. The cross-section 14 has the shape of an isosceles triangle with a height h (=width of the layer 12'), sides s and a base b. The angle σ between the sides s and the base b amounts in many cases to 45°.

The specific surface area a of this packing is given in the ideal case in which the fold edges have no roundings by the expression $2\sqrt{2}/h$.

FIG. 3 shows results of recent basic experiments for packings 1 with the structure illustrated in FIG. 2, with σ=45° and with ϕ taking on values in the range between 20° and 70°. These results were obtained for constant fluid flows and $F=V_G\sqrt{\rho_G}=1.5$ $Pa^{0.5}$ (VG=flow velocity, $\rho_G$=density of the gas G). The number n of theoretical separation stages per meter, namely the parameter NTSM, can be empirically determined and represented by a first function $f_1(a, \phi)$ of the variables a and ϕ. The flow resistance which results for a gas flow which flows through the packing can be characterized by a pressure loss per meter, Δp, as a second function $f_2(a, \phi)$. Through elimination of ϕ from the functions $f_1$ and $f_2$, Δp can be expressed as a function of a and n. This function is illustrated in the diagram of FIG. 3 as an array of curves 31, 32, . . . 36, with each of these curves representing the pressure drop Δp for NTSM=const, namely n=1, 2, . . . 6, in dependence on the specific surface area a. Each of these curves 31, 32, . . . 36 has a relative minimum for which in each case the variables a and ϕ assume values $a_m(n)$ and $\phi_m(n)$ respectively. The minimum points lie on the curve 30 which is drawn in chain-dotted lines. The numbers given in the table of FIG. 4 are approximately valid for the values $a_m$ and $\phi_m$. The rows of numbers can be expressed by means of the formulas which are additionally given in FIG. 4. For other packings with cross channel structure, for which a does not amount to 45° or which for example are constructed of corrugated films, other numbers must of course be expected for the values $a_m$ and $\phi_m$.

The minimum points of the curve 30 have a special significance, since the curves 31, . . . 36 are in each case very flat in the vicinity of their minimum: For the minimum points the flow resistances are the lowest for a predetermined separation performance. It is possible to pass to a lower specific surface area a without the flow resistance substantially increasing, and indeed with the separation performance remaining the same. With increasing distance from the minimum point, however, the flow resistance then increases progressively. Somewhere there is an optimum. Criteria for an optimum are, on the one hand, the costs for the packing, in particular for the material of the packing, and, on the other hand, the pressure losses of the gas flow in the operation of the column. How the optimizing is to be carried out depends on the particular circumstances of the individual case.

A broken straight line 40, for which ϕ=42°, gives approximately the values Δp for the known class of packings 125.Y, . . . (cf. lower margin of the diagram in FIG. 3). As one sees, this straight line 40 extends for a<550 $m^{-1}$ at a small distance to the left along the curve 30 with the minimum points. This is in agreement with the known knowledge that the use of the packings 125.Y, . . . is favorable for separation performances which are not too high.

The straight line 40 intersects the curve 30 at approximately a=550 $m^{-1}$. This means that for approximately a>550 $m^{-1}$ or n>4.5 (curve 34) the class of packings 125.Y, . . . is no longer suitable for an economical process for material separation. For high separation performances a new class of packings must therefore be used, for which $a=a_{cl}$, $\phi=\phi_{cl}$ and the following conditions hold:

n>4.5, $a_{cl}<a_m(n)$, $\phi_{cl}>\phi_m(n)$ and $\phi_{cl}>45°$.

Through these conditions the upwardly open region above the curves 34', 50 and 30 is bounded. Due to the progressive increase of the flow resistance this region cannot extend upwards arbitrarily. An upward limitation results through the already mentioned optimizations. An arbitrarily assumed limitation is a straight line 60 on which ϕ is constantly equal to 55°. The hatched region 3 then determines the values of $a=a_{cl}$ and $\phi=_{cl}$, through which the class of the packings with cross channel structure in accordance with the invention is defined.

For practical reasons it is useful to form a subclass—with n (or NTSM) as a selectable parameter—for which $\phi=\phi_{cl}$ is a constant in analogy with the class of the packings 125.Y, . . . For $\phi_{cl}$, 50° or another value, which can differ from 50° by as much as about 2° or 3°, is preferably chosen.

As can be seen in the diagram of FIG. 3, the flow resistance increases progressively along the curve 30 with increasing n. It does thus not make sense to aim for values for the specific separation performance which are all too high. An upper limit for n, which is advantageously not exceeded, is given for n=7.

The packing in accordance with the invention is particularly suitable for carrying out an air decomposition. With a packing in accordance with the invention for example a reactive distillation can also be carried out.

In this method the material at the surfaces of the packing is at least partly catalytically active.

What is claimed is:

1. A packing with cross channel structure for a material exchange column with a high specific separation performance which is specifiable by a specific surface area, a, and an inclination angle of the passages, ϕ, and which belongs to a class of packings with $a=a_{cl}$ and $\phi=\phi_{cl}$, comprising:

for fluids which flow in the packing, equally large fluid flows are in each case provided;

a number n of theoretical separation stages per meter which can be empirically determined for the packing, wherein the parameter NTSM can be represented by a first function $f_1(a, \phi)$ of the variables a and ϕ;

a flow resistance which results for a gas flow which flows through the packing can be characterized by a pressure loss per meter, Δp, as a second function $f_2(a, \phi)$; and under an auxiliary condition n=const, Δp assumes a relative minimum for which the variables a and ϕ—in dependence on the parameter n—assume the values $a_m(n)$ and $\phi_m(n)$ respectively;

wherein n>4.5, $a_{cl}<a_m(n)$, $\phi_{cl}>\phi_m(n)$ and $\phi_{cl}>45°$.

2. A packing in accordance with claim 1, wherein $\phi_{cl}<55°$.

3. A packing in accordance with claim 1, wherein a subclass—with n as a selectable parameter—$\phi_{cl}$ is a constant, which amounts to about 50°.

4. A packing in accordance with claim 1, wherein the passages are formed by films which are folded in a zigzag manner; and the functions $a_m(n)$ and $\phi_m(n)$ respectively for $F=v_G\sqrt{\rho_G}=1.5$ $Pa^{0.5}$ are approximately given by the following polynomials:

$a_m=(152-13n+n^2)NTSM$ $\phi_m=27°+n(n+1)0.5°$.

5. A packing in accordance with claim 1, wherein values $a_{cl}$ and $\phi_{cl}$ are determined by means of an optimization which is carried out as a result of criteria which depend on a respective use in said optimization.

6. A packing in accordance with claim 5, wherein the criteria which depend on a respective use in said optimization comprise the costs for the packing.

7. A packing in accordance with claim 6, wherein costs for the packing comprise the costs for the material of the packing.

8. A packing in accordance with claim 5, wherein the result of criteria which depend on a respective use comprise the pressure losses of the gas flow during the operation of the column being kept small in an optimal manner.

9. A packing in accordance with claim 1, wherein a plurality of packing elements are arranged one above the other in a column, with each packing element being constructed of a large number of parallel layers.

10. A packing in accordance with claim 9 wherein an upper, a middle and a lower zone are distinguishable in the packing elements; and the flow resistance is reduced in the upper and lower zones at the edges of the packing elements with respect to that of the middle zone as a result of a suitable shaping.

11. A material exchange column comprising a packing, wherein the packing with cross channel structure for a material exchange column with a high specific separation performance which is specifiable by a specific surface area, a, and an inclination angle of the passages, $\phi$, and which belongs to a class of packings with $a=a_{cl}$ and $\phi=\phi_{cl}$, comprises:

for fluids which flow in the packing, equally large fluid flows are in each case provided;

a number n of theoretical separation stages per meter which can be empirically determined for the packing, wherein the parameter NTSM can be represented by a first function $f_1(a, \phi)$ of the variables a and $\phi$;

a flow resistance which results for a gas flow which flows through the packing can be characterised by a pressure loss per meter, $\Delta p$, as a second function $f_2(a, \phi)$; and under an auxiliary condition n=const, $\Delta p$ assumes a relative minimum for which the variables a and $\phi$—in dependence on the parameter n—assume the values $a_m(n)$ and $\phi_m(n)$ respectively;

wherein n>4.5, $a_{cl}<a_m(n)$, $\phi_{cl}>\phi_m(n)$ and $\phi_{cl}>45°$.

12. A method for the operation of a material exchange column, the method comprising:

providing a packing for the material exchange column with cross channel structure for a material exchange column with a high specific separation performance which is specifiable by a specific surface area, a, and an inclination angle of the passages, $\phi$, and which belongs to a class of packings with $a=a_{cl}$ and $\phi=\phi_{cl}$, wherein the packing comprises: for fluids which flow in the packing, equally large fluid flows are in each case provided; a number n of theoretical separation stages per meter which can be empirically determined for the packing, wherein the parameter NTSM can be represented by a first function $f_1(a, \phi)$ of the variables a and $\phi$; a flow resistance which results for a gas flow which flows through the packing can be characterised by a pressure loss per meter, $\Delta p$, as a second function $f_2(a, \phi)$; and under an auxiliary condition n=const, $\Delta p$ assumes a relative minimum for which the variables a and $\phi$—in dependence on the parameter n—assume the values $a_m(n)$ and $\phi_m(n)$ respectively; wherein n>4.5, $a_{cl}<a_m(n)$, $\phi_{cl}>\phi_m(n)$ and $\phi_{cl}>45°$; and carrying out a material separation at a specific separation performance of the packing for which n is greater than about 4.5 and for which n is less than about 7.

13. A method in accordance with claim 12, wherein the method is for carrying out an air decomposition, with material at surfaces of the packing being at least partly catalytically active.

14. A method in accordance with claim 12, wherein the method is for carrying out a reactive distillation, with material at surfaces of the packing being at least partly catalytically active.

* * * * *